United States Patent [19]
Moreno

[11] Patent Number: 5,180,189
[45] Date of Patent: Jan. 19, 1993

[54] VEHICLE STEERING COLUMN INSTALLATION

[75] Inventor: Ricardo H. Moreno, Sterling Heights, Mich.

[73] Assignee: General Motors Corporation, Detroit, Mich.

[21] Appl. No.: 752,354

[22] Filed: Sep. 3, 1991

[51] Int. Cl.⁵ .............................................. B62D 1/16
[52] U.S. Cl. .................................. 280/779; 219/91.21; 219/93; 296/901; 296/70
[58] Field of Search ...................... 280/779, 752, 780; 74/492; 180/90; 219/93, 94, 91.23, 91.21, 91.2; 296/70, 192, 901

[56] References Cited

U.S. PATENT DOCUMENTS

| | | | |
|---|---|---|---|
| 2,066,352 | 1/1937 | Kliesrath | 296/70 |
| 2,319,455 | 5/1943 | Hardman | 219/91.23 |
| 3,702,081 | 11/1972 | Arnston | 74/492 |
| 3,703,106 | 11/1972 | Arntson et al. | 74/492 |
| 3,803,938 | 4/1974 | Bratke et al. | 74/492 |
| 3,913,716 | 10/1975 | Sedlock | 219/93 |
| 4,063,060 | 12/1977 | Litch, III | 219/93 |
| 4,362,331 | 12/1982 | Harasaki et al. | 180/90 |
| 4,391,465 | 7/1983 | Piano | 296/192 |
| 4,452,096 | 6/1984 | Workman | 74/492 |
| 4,671,536 | 6/1987 | Yoshimura | 74/492 |
| 4,988,144 | 1/1991 | Johnson et al. | 296/192 |

FOREIGN PATENT DOCUMENTS

| | | | |
|---|---|---|---|
| 102927 | 3/1984 | European Pat. Off. | 219/93 |
| 293984 | 11/1989 | Japan | 219/94 |
| 498095 | 1/1939 | United Kingdom | 180/90 |

Primary Examiner—Karin L. Tyson
Attorney, Agent, or Firm—Raymond I. Bruttomesso, Jr.

[57] ABSTRACT

A steering column bracket assembly for a steering column of a vehicle body includes a filled polymeric plastic modular unit carried by the vehicle body having a U-shaped beam with an inner surface and an outer surface and a panel. The panel and the U-shaped beam define an air duct. The U-shaped beam has an upper wall, a side wall and a lower wall with the walls having a plurality of holes and at least one of the walls having a groove. A support bracket has a plurality of flanges for engaging the outer surface of the U-shaped beam and a protrusion for aligning with and being received by the groove of the U-shaped beam. A plurality of embossments on the support bracket align with and are received by the holes in the beam. A steering column bracket mounts to the support bracket securing the steering column to the support bracket. An insert bracket engages the inner surface of the U-shaped beam and has a recess for aligning with and receiving the groove of the U-shaped beam. A plurality of embossments on the insert bracket align with and are received by the holes in the beam whereby the embossments of the brackets are connected securing the support bracket to the beam to secure the steering column to the vehicle body.

6 Claims, 2 Drawing Sheets

VEHICLE STEERING COLUMN INSTALLATION

This invention relates generally to vehicle steering column installations and more particularly to the attachment of the steering column assembly to a composite structural body assembly.

BACKGROUND OF THE INVENTION

Typically, a steering column assembly for a modern automobile is an elongated structure having a substantially mass concentration at the hub or steering wheel end and a pair of outer tube or mask jacket sections adapted for relative telescopic or longitudinal collapse in an energy absorbing mode. To adequately support the column assembly, and more particularly the hub end on the body of the vehicle, the lower end of one of the mast jacket sections is usually anchored to the fire wall or bulkhead portion of the body while the other of the mast jacket sections is attached to reinforcing members behind the instrument panel through releasable fasteners which permit collapse of the column assembly under impact but which rigidly support the hub end of the column assembly during normal operation.

The reinforcing members are steel brackets and struts that extend to the firewall. The reinforcing members are either bolted or welded to the firewall. In the alternative, the reinforcing members extending from the column to structure on the side of the vehicle. The requirement for the reinforcing members limits placement of other items behind and within the instrument panel, for example air ducts and instrument panel air outlets.

It would be desirable to have an assembly for securing the steering wheel to a filled polymeric plastic beam which is part of a composite modular unit.

SUMMARY OF THE INVENTION

This invention provides a steering column bracket assembly for a steering column of a vehicle body. The steering column bracket assembly includes a filled polymeric plastic modular unit carried by the vehicle body having a U-shaped beam with an inner surface and an outer surface and a panel. The panel and the U-shaped beam define an air duct. The U-shaped beam has an upper wall, a side wall and a lower wall with the walls having a plurality of holes and at least one of the walls having a groove. A support bracket has a plurality of flanges for engaging the outer surface of the U-shaped beam and a protrusion for aligning with and being received by the groove of the U-shaped beam. A plurality of embossments on the support bracket align with and are received by the holes in the beam. A steering column bracket mounts to the support bracket securing the steering column to the support bracket. An insert bracket engages the inner surface of the U-shaped beam and has a recess for aligning with and receiving the groove of the U-shaped beam. A plurality of embossments on the insert bracket align with and are received by the holes in the beam whereby the embossments of the brackets are connected securing the support bracket to the beam to secure the steering column to the vehicle body.

One object, feature and advantage resides in the provision of a steering column bracket assembly for a steering column of a vehicle body, the steering column assembly bracket includes a non-metallic beam carried by the vehicle body having a first side and a second side and a plurality of holes between the sides, and a support bracket engaging the first side of the beam with a plurality of embossments for aligning with and being received by the holes in the beam, a steering column bracket for securing the steering column to the support bracket, and an insert bracket for engaging the second side of the beam having a plurality of embossments for aligning with and being received by the holes in the panel whereby the embossments of the brackets are connected securing the support bracket to the beam to secure the steering column to the vehicle body.

Further objects, features and advantages of the present invention will become more apparent to those skilled in the art as the nature of the invention is better understood from the accompanying drawings and detailed description.

DESCRIPTION OF THE PREFERRED EMBODIMENT

Figure 2:
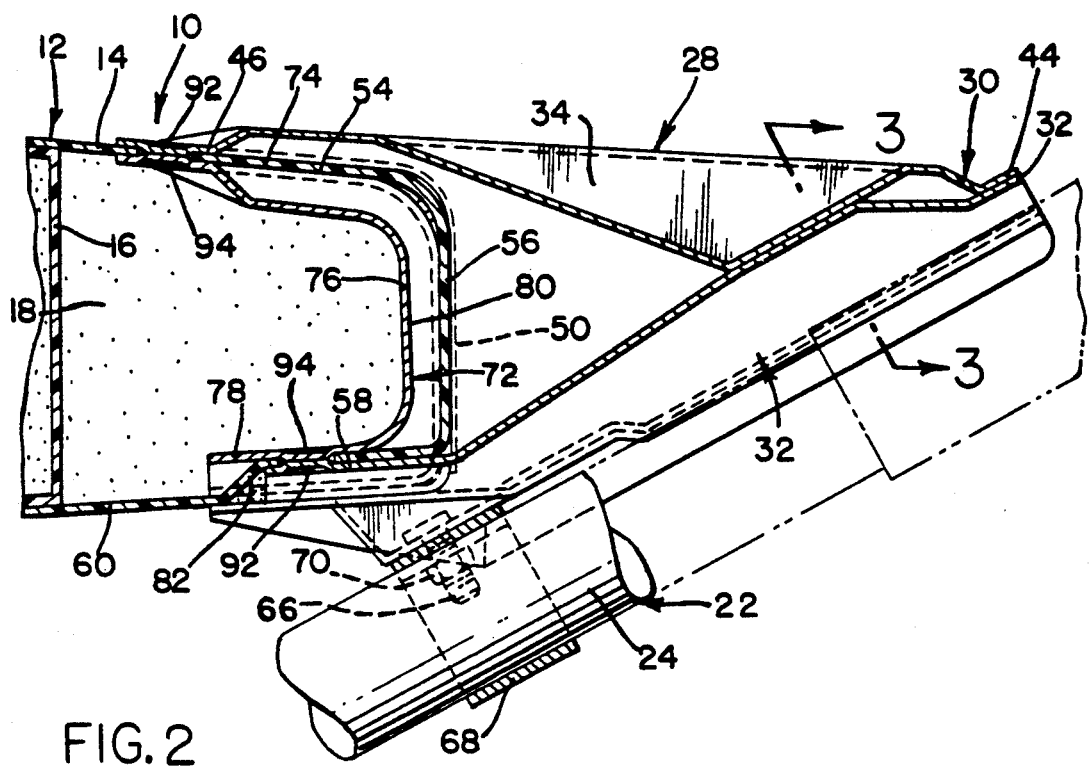
FIG. 2 is a section view of the composite modular unit with the support bracket carrying the steering column assembly.

Referring to FIG. 2, a vehicle 10 has a composite modular unit 12 made of a filled polymeric plastic, or other suitable material, that includes the fire wall, not shown. The composite modular unit 12 is installed in the vehicle as one single unit during manufacturing. The composite modular unit 12 includes a pair of panels 14 and 16 which are bonded together and define an air duct or plenum 18 for the heat and air conditioning system of the vehicle 10.

U.S. Pat. No. 4,597,461, Kochy et al., Vehicle Having Pre-assembled Constructional Unit for the Cockpit Region Thereof, assigned to General Motors, discloses a pre-assembled module for a vehicle which is adapted to be mounted as one single unit inside the vehicle body and includes a metal fire wall.

Figure 1:
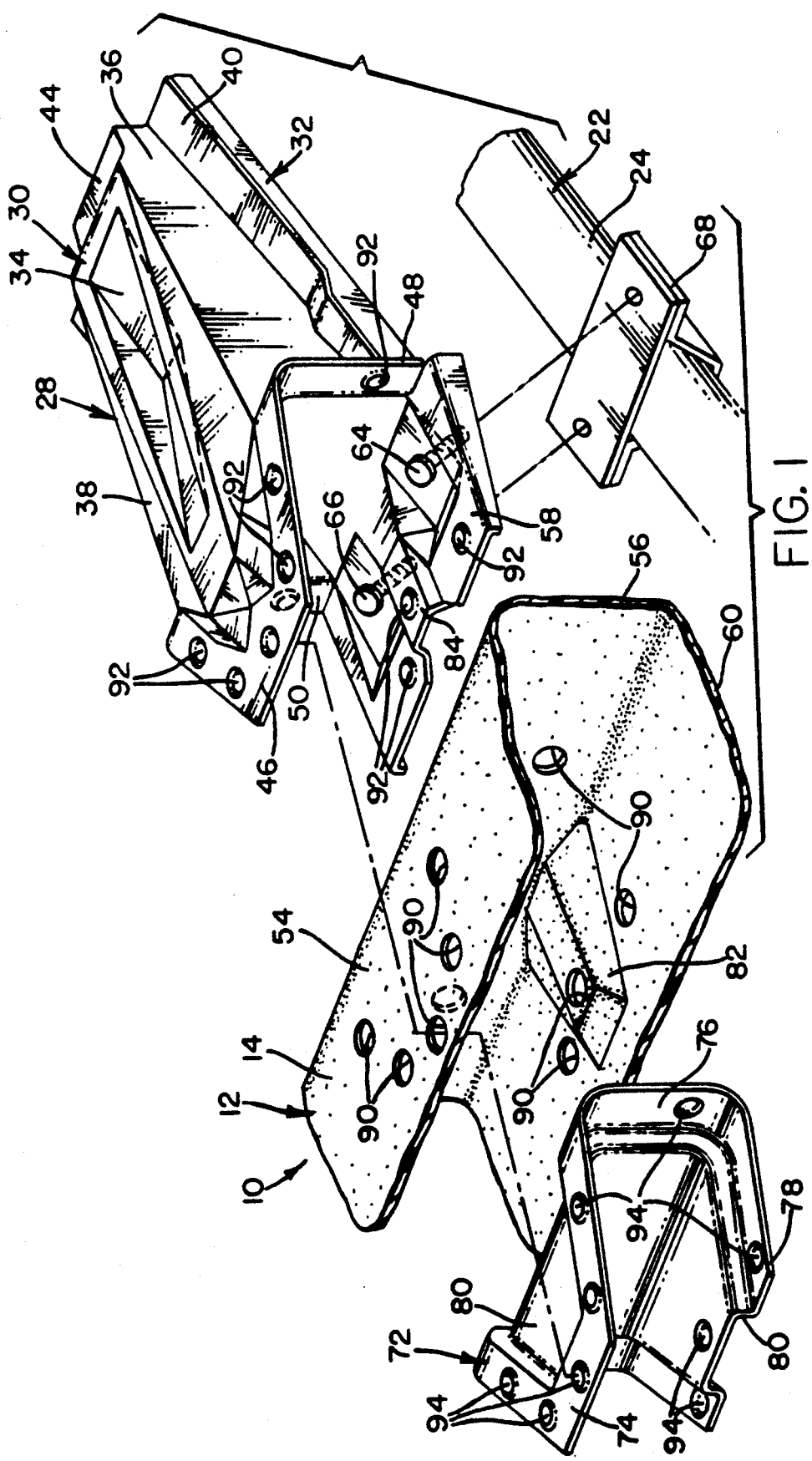
FIG. 1 is an exploded fragmentary view in perspective of the invention.

Referring to FIG. 1, a steering column assembly 22 is secured in the vehicle 10 at several locations including an outer columnar member 24 of the steering column 22 attached to a support member 28.

Figure 3:
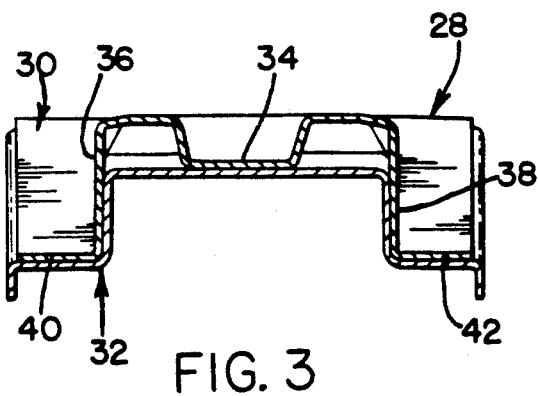
FIG. 3 is a sectional view taken in the direction of arrows 3—3 of FIG. 2.

The support member 28 is formed form a pair of stamped steel components 30 and 32 that are spot welded together before assembly on the composite modular unit 12 and vehicle 10. Referring to FIGS. 2 and 3, the upper component 30 has a central depressed rib 34, a pair of side walls 36 and 38, a pair of lower flanges 40 and 42, and a trailing edge 44 that are spot welded to the lower component 32. Referring to FIG. 1, the upper component 30 has a forward edge flange 46 and a pair of depending flanges 48 and 50 for engaging an upper wall 54 and a side wall 56 of the U-shaped beam 14 of the composite modular unit 12. The lower component 32 of the support member 28 has a forward edge flange 58 for engaging a lower wall 60 of the U-shaped beam 14 of the composite panel unit 12.

Referring to FIGS. 1 and 2, a pair of bolts 64 and 66 depend from the lower component 32 of the support member 28 receive a two-piece steering column bracket 68. A pair of nuts 70 secures the bracket 68 and the outer columnar member 24 to the bolts 64 and 66 and the support member 28.

Referring to FIG. 1, an insert bracket 72 is located in the air duct 18. The insert bracket 72 has a top surface 74, a side surface 76 and a bottom surface 78 which engage the upper wall 54, side wall 56 and lower wall 60 of the U-shaped beam 14 of the composite modular unit 12, respectively. The insert bracket 72 has a recessed portion 80 which aligns with and engages with a recess 82 in the lower wall 60 of the U-shaped beam 14 of the composite modular unit 12. Referring to FIG. 1, the lower component 32 of the support member 28 has a protrusion 84 which aligns with and engages the recess 82 on the other side of the composite modular unit 12.

Figure 4:
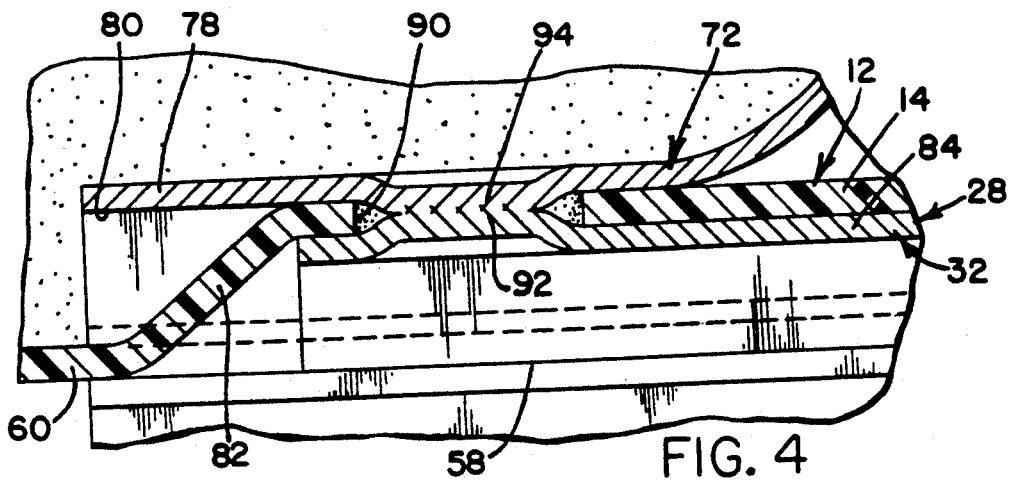
FIG. 4 is an enlarged view of one of the spot welds.

The U-shaped beam 14 has a plurality of holes 90 placed in a specific pattern to align with and receive a set of embossments 92 on the flanges 46, 48, 50, and 58 of the support member 28. The holes 90 also align with and receive a set of embossments 94 on the insert bracket 72. Referring to FIG. 4, the embossments 92 of the support member 28 and the embossments 94 of the insert bracket 72 are spot welded together to secure the support member 28 to the composite modular unit 12.

During assembly of the vehicle 10, the two components 30 and 32 of the support member 28 are spot welded together. The insert bracket 72 is located in the U-shaped beam 14 with the recessed portion 80 aligned with the recess 82 of the lower wall 60 of the beam 14. The embossments 94 align with the holes 90 in the U-shaped beam 14. The support member 28 with the protrusion 84 are received in the recess 82 of the lower wall 60 of the U-shaped beam 14. The embossments 92 and 94 are spot welded together to connect the support member 28 and the insert bracket 72 together and sandwich the beam 14 thereby the U-shaped beam 14 carries the support bracket 28. The support member 28 and insert bracket 72 can be connected together prior to the U-shaped beam 14 being connected to the remainder of the composite modular unit 12 or after providing there is enough access to the insert bracket 72 in the air duct 18 for spot welding. The steering column assembly 22 can be mounted to the support member 28 prior to installing the composite modular unit 12 in the vehicle.

While an embodiment of the present invention has been explained, various modifications within the spirit and scope of the following claims will be readily apparent to those skilled in the art.

The embodiments of the invention in which an exclusive property or privilege is claimed are defined as follows:

1. A steering column bracket assembly for a steering column of a vehicle body, the steering column assembly bracket comprising:
   a polymeric beam carried by the vehicle body having a first side and a second side and a plurality of holes between the sides and the beam having a groove;
   a support bracket engaging the first side of the beam and having a protrusion for aligning and engaging with the groove of the beam and having a plurality of embossments for aligning with and being received by the holes in the beam;
   mounting means for securing the steering column to the support bracket; and
   an insert bracket for engaging the second side of the beam and having a recess for aligning with and receiving the groove of the beam and having a plurality of embossments for aligning with and being received by the holes in the beam whereby the embossments of the brackets are connected through the holes in the beam securing the support bracket to the beam to secure the steering column to the vehicle body.

2. A steering column bracket assembly for a steering column of a vehicle body, the steering column assembly bracket comprising:
   a filled polymeric plastic modular unit carried by the vehicle body having a U-shaped beam with an inner surface and an outer surface and a panel where the panel and beam define an air duct and the U-shaped beam having an upper wall, a side wall and a lower wall and at least one wall having a groove and the walls having a plurality of holes;
   a support bracket having a plurality of flanges for engaging the outer surface of the U-shaped beam and a protrusion for aligning with and being received by the groove of the U-shaped beam and a plurality of embossments for aligning with and being received by the holes in the beam;
   mounting means for securing the steering column to the support bracket; and
   an insert bracket for engaging the inner surface of the U-shaped beam and having a recess for aligning with and receiving the groove of the U-shaped beam and having a plurality of embossments for aligning with and being received by the holes in the U-shaped beam whereby the embossments of the brackets are connected securing the support bracket to the beam to secure the steering column to the vehicle body.

3. A steering column bracket assembly as in claim 2, wherein the support bracket has an upper component and a lower component and the lower component has a flange with the protrusion which align with the groove in the lower wall of the U-shaped beam.

4. A steering column bracket assembly as in claim 3, wherein the mounting means is a steering column bracket mounted to the lower component of the support bracket.

5. A steering column bracket assembly as in claim 2, wherein the embossments of the insert bracket and the support bracket are spot welded together.

6. A method of mounting a steering column to a vehicle which comprises:
   engaging an insert bracket having a recess and a plurality of embossments with an inner surface of a non metallic U-shaped beam having a groove that the recess of the insert bracket aligns with and receives and a plurality of holes that the embossments align with and receive;
   engaging a support bracket having a protrusion for aligning with and being received by the groove of the beam and a plurality of embossments for aligning with and being received by the holes in the beam;
   securing the support bracket to the beam by welding the embossments of the brackets together through the holes in the beam sandwiching the beam;
   mounting the steering column to the support bracket; and
   mounting the U-shaped beam to the vehicle.

* * * * *